June 13, 1961                J. H. LOGAN                2,988,393
                        TREE DIGGER AND CONTAINER
Filed Dec. 24, 1958                              3 Sheets-Sheet 3
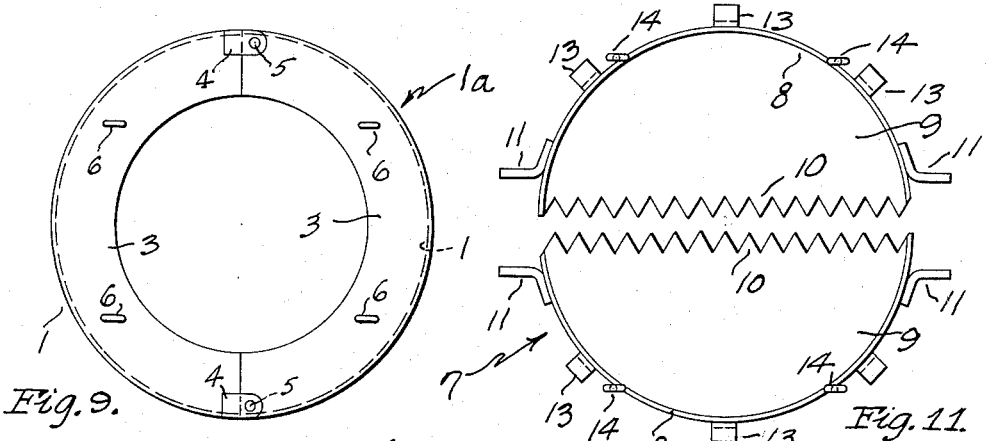
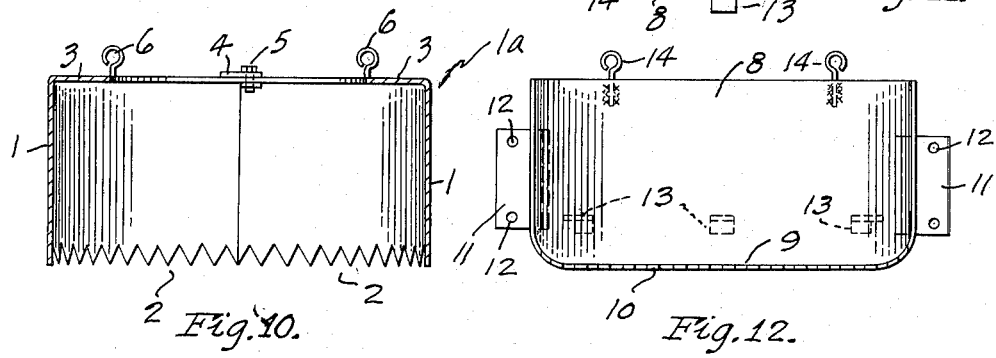
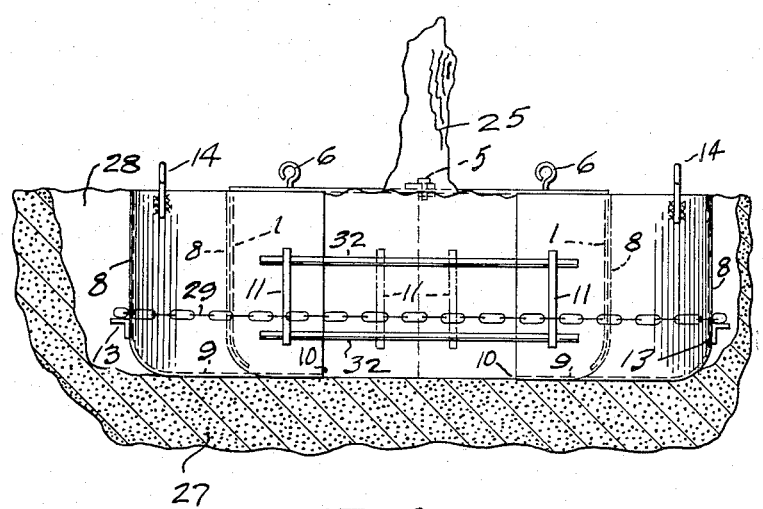
INVENTORS
John H. Logan
By Wooster & Davis
ATTORNEYS.

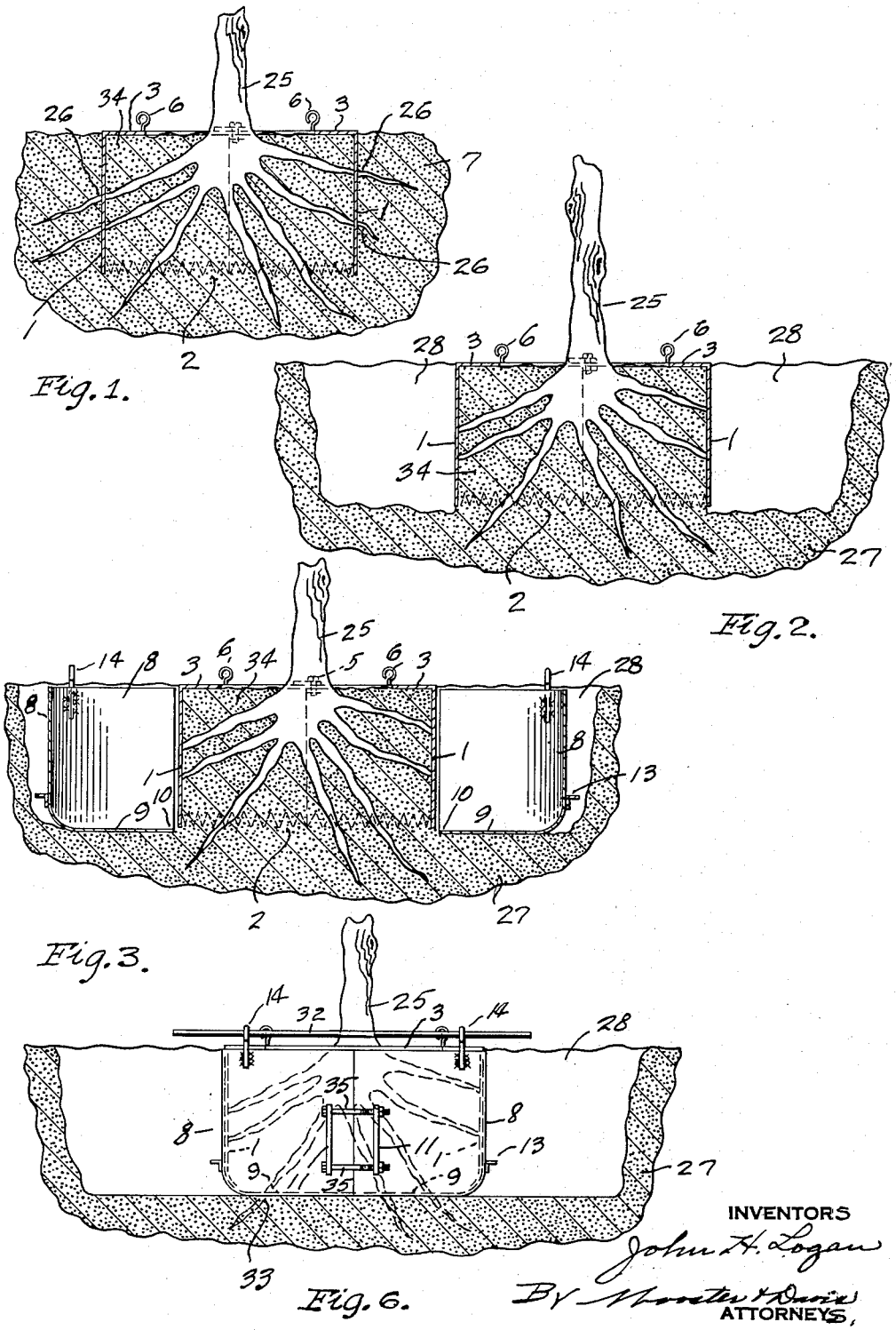

United States Patent Office 2,988,393
Patented June 13, 1961

2,988,393
TREE DIGGER AND CONTAINER
John H. Logan, Box 771, Canaan, Conn.
Filed Dec. 24, 1958, Ser. No. 782,969
4 Claims. (Cl. 294—15)

This invention relates to a tree digger and container and has for an object to provide a means whereby in digging trees for transportation or storage a ball of dirt may be maintained about the roots without loosening or falling away to break the fine hairs of the roots and cause delays in starting and set-backs to the tree after replanting.

It is also an object to provide means whereby Christmas trees, for example, could be kept alive while being used, to reduce the fire hazard, as they are thus prevented from drying out, and then after being used as a Christmas tree it can then be transplanted outside as a shade or ornamental tree.

It is a still further object to provide a means of digging and maintaining the dirt about the roots of a tree, which is a great improvement over the present method of wrapping dirt and roots in burlap and tying, one in which the dirt and roots do not dry out as quickly as when wrapped in burlap, the dirt holds better so that it does not loosen, the device does not rot away in storage as does burlap, and is much easier to apply than the usual burlap wrapping method.

With the foregoing and other objects in view, I have devised the construction illustrated in the accompanying drawings forming a part of this specification, and the method of use. It is, however, to be understood the invention is not limited to the specific details of construction and arrangement shown, but may embody various changes and modifications within the scope of the invention.

In these drawings:

FIG. 1 is a sectional view indicating how the side cutter of FIGS. 9 and 10 is employed in cutting the side roots and separating the ball of dirt enclosing these roots at its sides from the main body of dirt;

FIG. 2 is a similar section showing the next operation;

FIG. 3 is a similar section showing the beginning of the next operation and how the bottom cutter is placed in position preparatory to cutting the bottom roots under the ball of dirt and separating this ball from the main body of dirt;

FIG. 5 is a partial section and partial side view thereof;

FIG. 6 is a similar view showing the members of the bottom cutter drawn together;

FIG. 9 is a top plan view of the side cutter;

FIG. 10 is a vertical section thereof;

FIG. 11 is a top plan view of the bottom cutter;

FIG. 12 is a view taken toward the open side of one section of this cutter;

Figure 4:
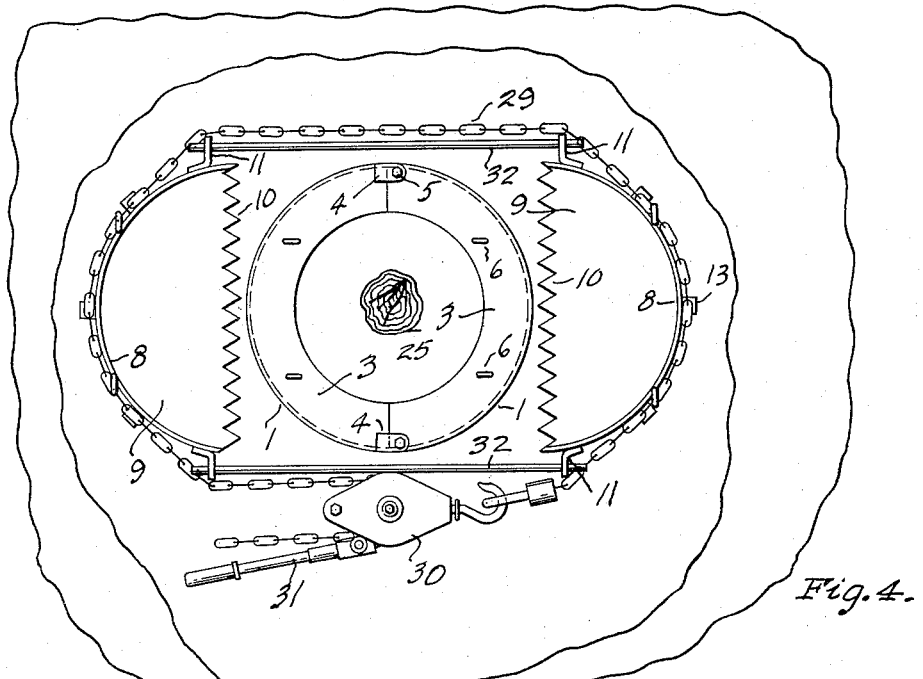
FIG. 4 is a plan view of FIG. 3 showing how a puller hoist or similar mechanism may be used to force or draw the members of the bottom cutter together for the bottom cutting operation.

The common practice, in preparing trees for transportation, storage and transplanting, is to dig around the roots of the tree at a suitable distance from the trunk or stem to leave a ball of dirt on the roots and enclose this in a burlap covering to hold the dirt on the roots during storage or handling. This is a difficult job to do properly as it is difficult to prevent the dirt from loosening and breaking or falling away from the roots, and this breaks the fine hairs of the roots and delays starting and causes set-back to the tree. It also permits drying out of the dirt and the roots unless kept properly moistened, and if held for a considerable time the burlap is apt to rot and break away.

It is an object of this invention to overcome these objections as well as to improve the operation of digging the tree and preparing it for transportation and storage, and also to keep the tree alive and in better condition indefinitely.

My digger comprises a side cutter which is first forced into the ground around the tree at a suitable distance therefrom, depending on the size of the ball of dirt to be retained, a bottom cutter to be forced from opposite sides under the side cutter to cut the roots and separate the ball of dirt from the soil at the underside or bottom of this ball, and a split container in which the separated ball of dirt is placed and retained for transportation, storage or other handling.

FIGS. 9 and 10 are, respectively, a top plan view and a vertical section of the side cutter 1a. This is composed of two members each having vertical curved side walls 1 the lower edges of which are cutting edges, preferably saw-toothed edges for improved cutting effect, as indicated at 2, and at their upper edges are provided with an inturned flange 3 which by engagement with the top of the soil limits downward movement of the cutter in use and prevents it being forced too deeply into the soil. Means is provided for securing these members together, such, for example, as a clip 4 welded to one member and overlapping the flange of the other member to which it may be secured by a suitable pin or bolt 5, and means may be provided for lifting this cutter from the enclosed ball of dirt at the proper time, as will later be described, such means in the arrangement shown comprising suitable hooks or eyes 6 in the top flange through which a rod may be inserted for lifting.

The side walls 1 are preferably curved so that when the two sections are secured together as shown they provide a substantially circular or cylindrical member.

The bottom cutter 7, as shown in FIGS. 11 and 12, also comprises a pair of members each including an upright curved side wall 8 and a bottom wall 9 extending inwardly from the lower edge thereof provided with a cutting edge 10 which is also preferably a saw-toothed edge for better cutting effect. Angle ears 11 are secured by any suitable means, such, for example as welding to these curved side walls adjacent their free edges and provided with means, such for example as openings 12, whereby the members may be secured together by suitable bolts at the proper time, or may operate as guide means during operation of this cutter, as will later be described. Also small lugs 13 may be welded or otherwise secured to the outer sides of these walls a short distance above the lower edge thereof to provide supporting means for a suitable tackle for forcing or drawing the members together, as will later be described. Also suitable hooks or eyes 14 may be secured to the top edges of the side members whereby a lifting rod may be inserted between them for lifting the device and any other elements which may be enclosed therein.

Figures 13, 14:
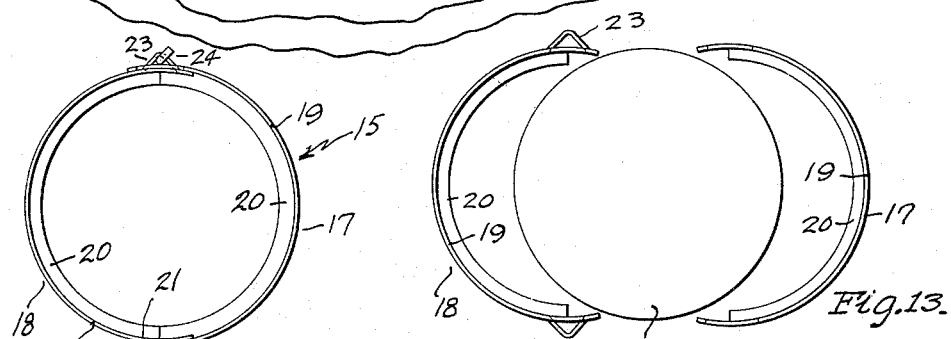
FIG. 13 is a plan view of the bottom disc of the split container, and also showing the side members of this container separated therefrom but in position to be applied to this bottom after the tree and the ball of dirt have been placed thereon.
FIG. 14 is a top plan view of the split container with the bottom disc omitted.
Figure 15:
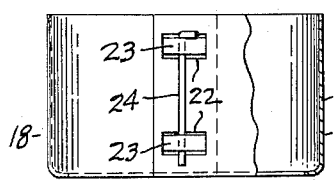
FIG. 15 is a partial side elevation and partial vertical section thereof.
Figures 7, 8:
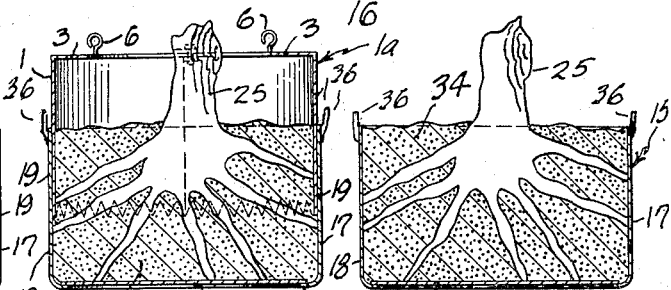
FIG. 7 is a vertical section showing the tree with its ball of dirt and the side cutter transferred to its final split container by lifting the bottom cutter with these elements, as shown in FIG. 6, lifted from the hole in the ground to transfer the tree with the ball of dirt to the split container and with the side cutter partially removed from this container.
FIG. 8 is a similar section with the side cutter removed and showing the tree with the ball of dirt in the split container and ready for transportation or storage.

The split container 15, which is used as the final container to retain the ball of dirt at the roots of the tree during handling or storage, is shown in FIGS. 13 to 15, and in their final use in FIGS. 7 and 8. This split container comprises a separate bottom disc 16 and two side members 17 and 18. Each member comprises a vertical curved side wall 19 with a narrow inwardly extending flange 20 at its lower edge. Means is provided for securing the side walls of these two members together. In this case they are of a size to overlap, as indicated at 21, one of them being provided with elongated openings 22 and the other being lanced and forced outwardly between the cuts of the lancing to provide ears or loops 23 which may pass through these openings and receive a bolt or pin 24 to secure the two members together.

The operation and method of use of the device is shown in FIGS. 1 to 8. The first operation is to force the separate members of the side cutter 1a vertically down through the soil around the tree, the lower portion of the stem or trunk of which is shown at 25. The member 1a is of a size such that the curved side walls 1 are spaced from the tree the desired distance to provide a wall of dirt of the size desired, in ordinary use being of about two feet in diameter, for example. Forcing these members down into the soil causes the lower toothed edges 2 to cut the side roots, as indicated at 26, and provide a ball of dirt enclosing the roots on the tree trunk, which is separated by the walls 1 from the remainder of the ground or soil 27, as indicated in FIG. 1. The downward movement of the side cutter members is limited by the top flanges 3, as indicated.

The next operation is to dig around the outside of this side cutter a trench or hole 28 in the body of the soil 27, as shown in FIG. 2, of a size to receive the two members of the bottom cutter 7, as shown in FIG. 3, and of a depth so that the lower walls 9 of the bottom cutter rest on the bottom of this hole just below the lower edges of the side walls 1 of the side cutter 1a. Then a suitable hoist, or other tackle, such, for example, as the type shown in FIG. 4, comprising a chain 29 and a block 30 operated by a lever 31 and suitable mechanism (not shown) to draw together the free ends of the chain, is placed in the hole with this chain about the bottom cutter, as shown in FIGS. 4 and 5, with the chain resting on the guide lugs 13. Also guide rods 32 are placed through the openings 12 in the upright side lugs 11. The toggle 31 is now operated to draw the free ends of the chain together about the bottom cutter, and this forces the opposite members of this cutter inwardly toward each other, forcing their bottom walls 9 with their cutting edges 10 inwardly under the lower edges of the side cutter 1 to the position of FIG. 6. The guide lugs 13 are placed low on the side members 8 so as to locate this toggle device close to the level of the lower walls 9 in forcing them into the ball of dirt enclosed by the side cutter 1a. During this operation the cutting edges 10 of the bottom walls 9 are forced through the ball of dirt and cut off portions of the bottoms of the downwardly extending roots 33, as shown in FIG. 6, and also separate the bottom of the ball of dirt 34 enclosed in the side cutter from the body of soil 27 surrounding the hole 28. During this inward movement of the bottom cutter they are maintained in alignment and properly level by the guide rods 32. After they are brought together or to the position of FIG. 6 these guide rods 32 are removed, and the two members of the bottom cutter are secured together by suitable bolts 35 threaded through the openings 12 in the members 11. The tackle 29, 30 may now be removed and the guide rods 32 may be threaded through the hooks or eyes 14, as shown in FIG. 6, and provide handles for lifting this assembly including the bottom cutter 7, the side cutter 1a, and the tree with the ball of dirt about its roots which have now been entirely separated from the body of the surrounding soil 27.

After this assembly is removed from the hole in the ground it is placed on the bottom disc 16 of the split container, which is separate from the side members 17 and 18 and detachable therefrom. After this assembly is placed on this bottom disc 16 the members of the bottom cutter 7 are disconnected and removed from the assembly, leaving the side cutter 1a enclosing the ball of dirt, which now rests on this bottom disc 16, the ball being held together by this side cutter. The side members 17 and 18 of the split container 15 are now brought against the opposite sides of the side cutter 1a, as shown in FIG. 7, with their lower flanges 20 inserted under the peripheral edges of the disc 16 so that this disc 16 is now supported on these flanges 20. The side members of the split container now overlap at the free edges with the ears 23 extending through the openings 22, and the two members of the split container are secured together by inserting the pins 24 through these ears 23. The two members of the side cutter 1a may now be removed by inserting suitable lifting rods through the eyes 6 of this cutter. It is shown partly withdrawn or removed in FIG. 7. The operation is now complete, and the tree with its roots and the surrounding ball of dirt or soil unbroken and intact enclosed in the split container 15 and supported at its lower side by the bottom disc 16 as shown in FIG. 8, and the wall of dirt will be maintained in this solid unbroken condition by the split container 15 for transportation, storage, and other handling, including resetting of the tree in a hole dug into the soil at the desired location. After such planting the members of the split container may be removed. The bottom disc 16 may or may not be removed, and if left in place is not detrimental, but it could be made of material that would decay and disintegrate after a given length of time.

It will be seen from the above that this method and apparatus will separate the roots and the ball of dirt from the surrounding soil without breaking up the ball of dirt to be retained with the roots, and thus without injuring the roots by breaking the fine hairs of these roots. It permits the provision of simplified means of lifting and carrying the tree with the ball of dirt by suitable eyes 36 or other means which may be provided on the split container, instead of using ropes as is required with trees which have been burlapped and tied, which has a tendency to loosen the dirt around the roots. With this device and method trees can be moved safely at any time of the year. When the digger members comprising the side and bottom cutters are removed, the tree ball is compact and of a size to fit the split container 15. This container is especially designed to transport and hold shrubs and trees for several seasons if desired. Burlapped trees, if not replanted in a short time, must be re-burlapped. Trees in this split container can be held indefinitely. Each year hundreds of Christmas trees, for example, are cut, and after Christmas are a total loss. By placing the trees in this container they can be used alive for Christmas and then moved to the yard and set out in a dug hole, after which merely removing the pins 24 will release the side members, permitting them to be removed from the hole and then the hole filled in with a small amount of dirt to provide a permanent tree. A live Christmas tree is not a fire hazard. The container and the other apparatus for use therewith may be made in various sizes to safely transplant shrubs, plants and trees. The containers could be made of any suitable material, such, for example, as plastic, aluminum or galvanized metal, and the cutters also made of any suitable material, ordinarily metal of the proper thickness and quality to properly perform the operation desired.

Having thus set forth the nature of my invention, I claim:

1. In a tree digger and container, a side cutter comprising two members each having upright side walls with their lower edges providing cutting edges adapted to be forced into the soil about a tree at a suitable distance therefrom with their upright side edges adjacent to cut the side roots and separate a ball of dirt at its sides from the main soil and provide a retaining means for the sides of the ball, a bottom cutter comprising two members each including upright side walls and a horizontal wall extending inwardly therefrom at their lower edges, said horizontal walls each provided with a cutting edge adapted to be forced toward the other to cut the roots at the under side of the ball of dirt in the side cutter and of a width to provide a support for the under side of the ball, and securing means for securing the members of the bottom cutter together after being forced together to contain the first cutter and ball of dirt.

2. In a tree digger and container, a side cutter comprising two members each having upright concavely curved side walls with their lower edges providing cutting edges adapted to be forced into the soil about a tree at a suitable distance therefrom to cut the side roots and separate a ball of dirt at its sides from the main soil with said side walls providing a retaining means for the sides of the ball, said members also including inwardly extending flanges at their top edges providing means to limit downward movement of the members in the cutting operation, a bottom cutter comprising a pair of members each including upright curved side walls and a bottom wall extending horizontally inward from the lower edge of the side walls and provided with a free cutting edge, said members of the bottom cutter adapted to be forced inwardly toward each other from opposite sides whereby the cutting edges of the horizontal walls are forced inwardly to cut the bottom roots under the ball of dirt and this ball is separated from the main soil, said bottom walls of a width to provide a support for the under side of the ball, and detachable means for securing the members of the bottom cutter together after their inward movement to contain the first cutter and the ball of dirt.

3. In a tree digger and container, a side cutter comprising two members each having curved upright side walls with their lower edges providing cutting edges adapted to be forced with their upright side edges adjacent into the soil about a tree at a suitable distance therefrom to cut the side roots and separate a ball of dirt at its sides from the main soil and also provide a retaining means for the sides of the ball, a bottom cutter comprising a pair of members each including upright curved side walls and a bottom wall extending horizontally inwardly from the lower edge of the side wall provided with a free cutting edge, said members of the bottom cutter adapted to be forced inwardly toward each other from a hole dug around the first cutter whereby the cutting edges of the horizontal walls cut the roots under the ball of dirt and separate it from the main soil, said horizontal walls of a width to provide a support for the under side of the ball, detachable means for securing the members of the bottom cutter together after they have been forced to their inner position to contain the first cutter and the ball of dirt, and said bottom cutter provided with means whereby this cutter, the first cutter and the three with the separated ball of dirt may be lifted from the hole.

4. In a tree digger and container, a bottom cutter comprising a pair of members each including upright curved side walls and a bottom wall extending horizontally inward from the lower edge of the side walls provided with a free cutting edge, said members adapted to be forced inwardly toward each other from a hole dug about a tree and a ball of dirt on the roots thereof whereby the cutting edges will cut the roots under the ball of dirt and separate this ball from the main soil and the ball with the roots will be enclosed within the side and bottom walls of said members, lugs on the side walls provided with aligned openings, rods through said openings providing guides for keeping said members in alignment during their inward movement, means for detachably securing the members together, and said members provided with means whereby these members with the tree and ball of dirt may be lifted from the hole.

References Cited in the file of this patent
UNITED STATES PATENTS

| | | |
|---|---|---|
| 1,129,924 | Von Hassel | Mar. 2, 1915 |
| 1,776,375 | Russell | Sept. 23, 1930 |
| 2,261,384 | Jones | Nov. 4, 1941 |